Aug. 30, 1932.  C. HELD  1,874,747
MEAT SLICING MACHINE
Filed March 5, 1930  4 Sheets-Sheet 1

INVENTOR
Charles Held
BY C. P. Goepel
his ATTORNEY

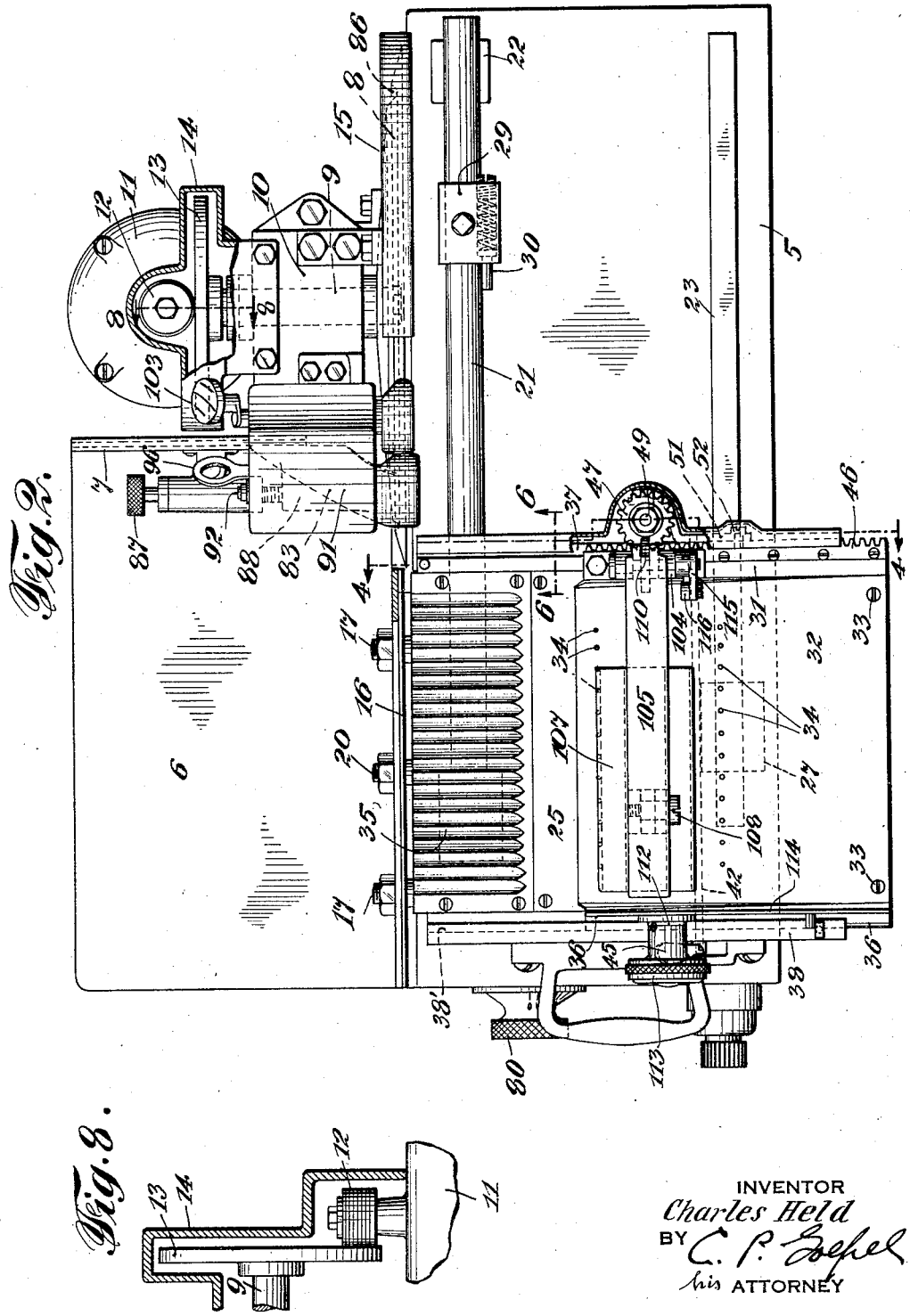

Aug. 30, 1932.  C. HELD  1,874,747
MEAT SLICING MACHINE
Filed March 5, 1930   4 Sheets-Sheet 3
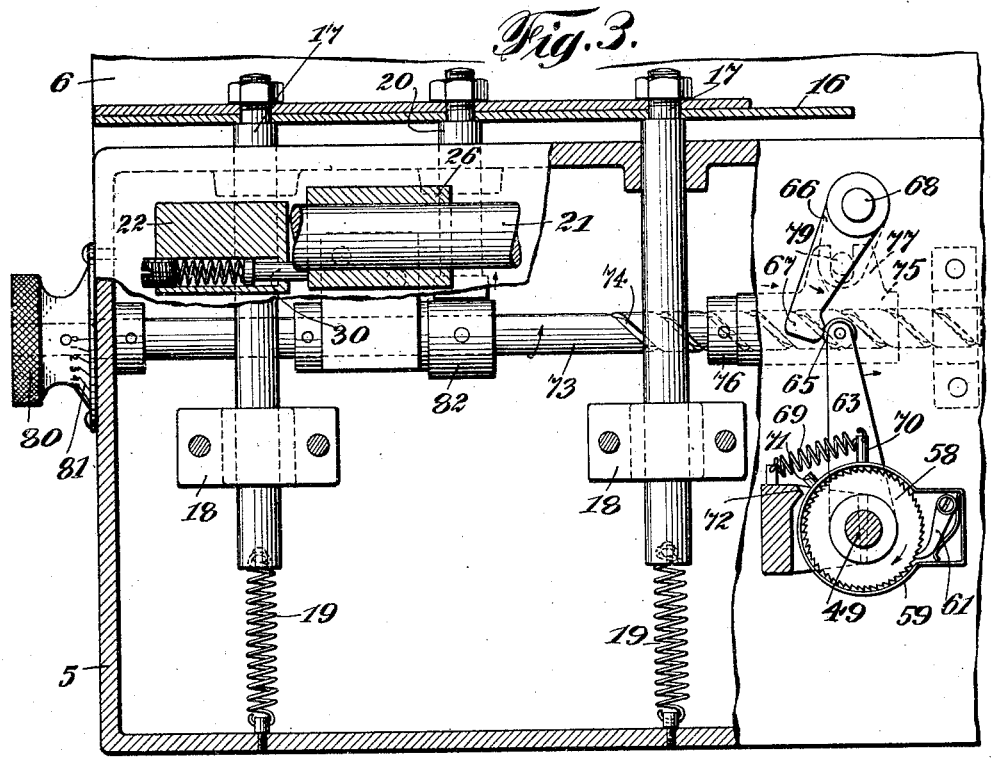
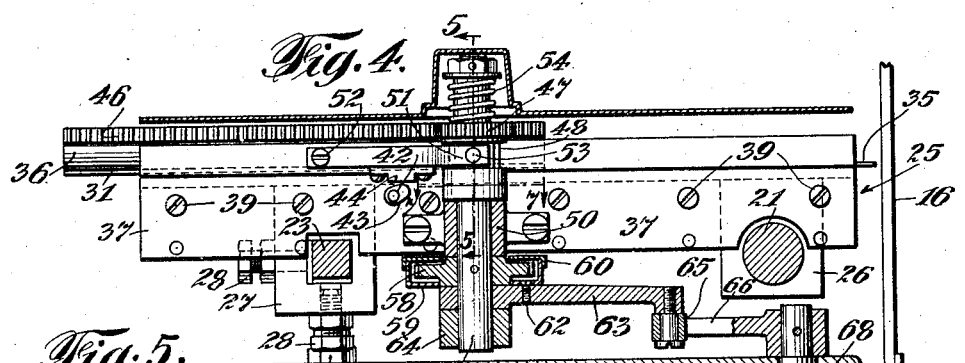
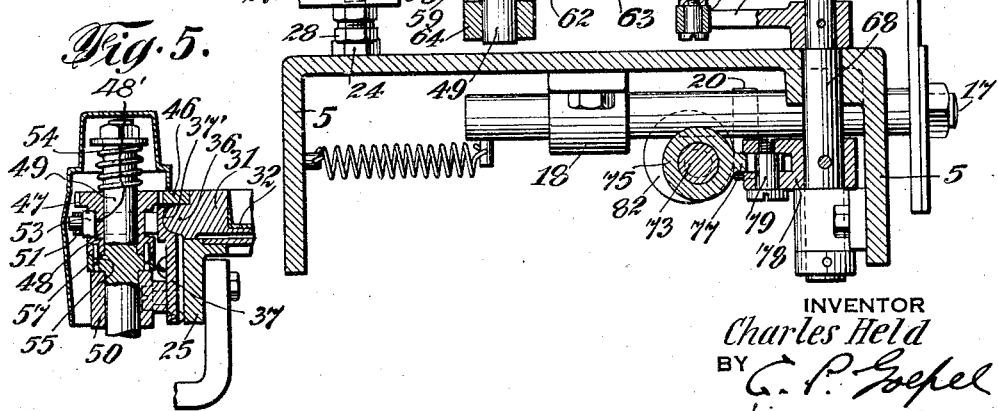
INVENTOR
*Charles Held*
BY *C. P. Goepel*
his ATTORNEY

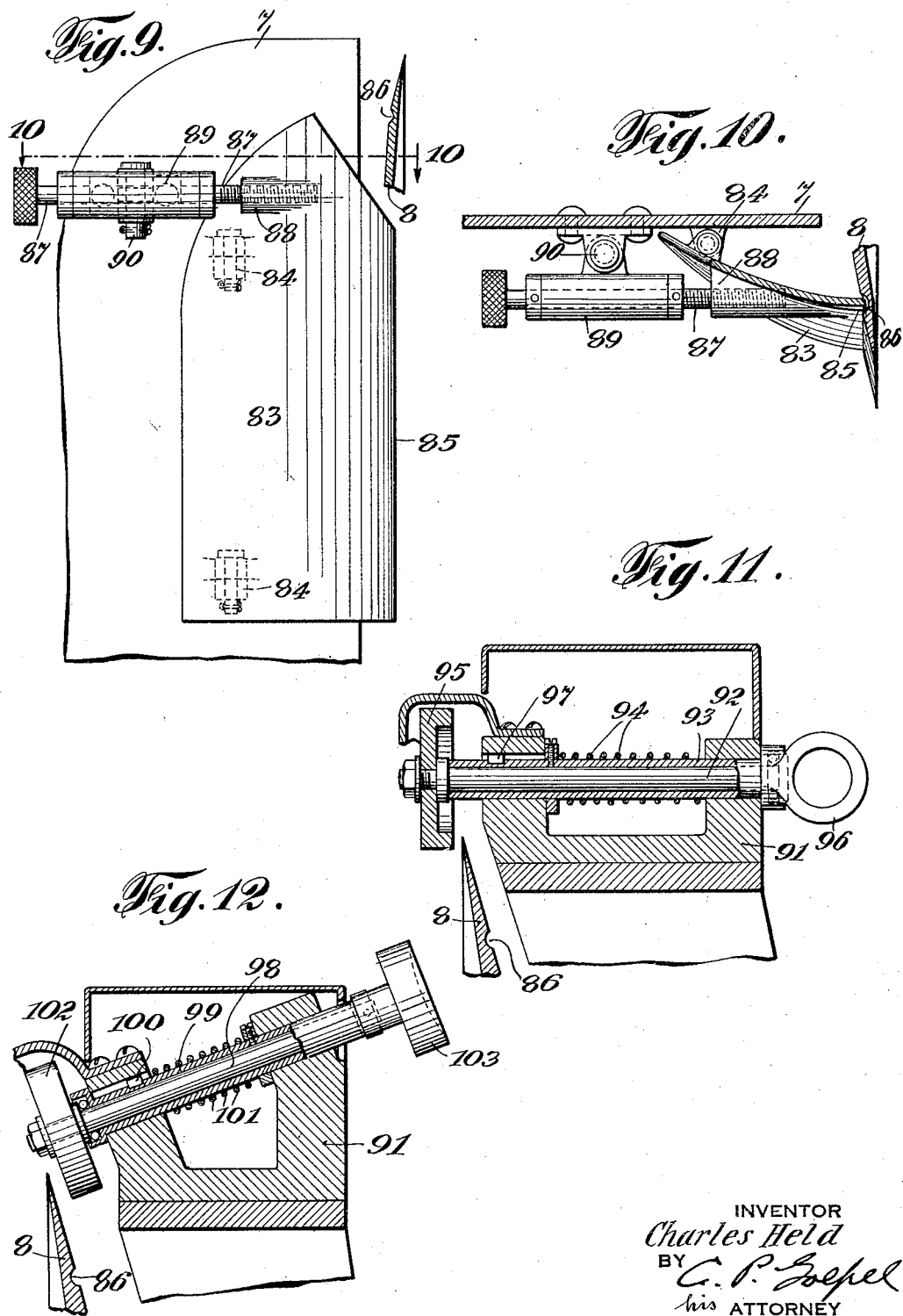

Patented Aug. 30, 1932

1,874,747

UNITED STATES PATENT OFFICE

CHARLES HELD, OF NEW YORK, N. Y.

MEAT SLICING MACHINE

Application filed March 5, 1930. Serial No. 433,195.

This invention relates to meat slicing machines, and has for one of its objects to provide an improved mounting of the bed plate or the meat table upon the manually operable sliding carriage together with novel means for automatically shifting the bed plate at the end of each return movement of the carriage after cutting a slice to position the meat with respect to the plane of rotation of the slicing knife to accurately cut slices of predetermined thickness.

It is a more particular object of the invention to provide means controlled by a single manually adjustable part for simultaneously positioning a stop or gauge plate relative to the plane of rotation of the slicing knife and adjusting a movable part which determines the extent of movement of the meat table relative to the sliding carriage whereby the end of the meat will be brought into contact with the face of the stop plate.

With the above and other objects in view, the invention consists in the improved meat slicing machine and in the form, construction and relative arrangement of its several parts as will be hereinafter more fully described, illustrated in the accompanying drawings and subsequently incorporated in the subjoined claims.

In the drawings, wherein I have disclosed one simple and practical embodiment of the several novel features of my invention, and in which similar reference characters designate corresponding parts throughout the several views,—

Fig. 2 is a top plan view, certain of the parts being shown in section;

Fig. 3 is a horizontal sectional view taken substantially on the line 3—3 of Fig. 1;

Fig. 4 is a vertical sectional view taken on the line 4—4 of Fig. 2;

Fig. 5 is a detail vertical section taken on the line 5—5 of Fig. 4;

Fig. 8 is a detail vertical section taken on the line 8—8 of Fig. 2, showing the drive means for the slicing knife;

Fig. 9 is a fragmentary elevation illustrating the adjustable meat slice deflecting means;

Figure 1:
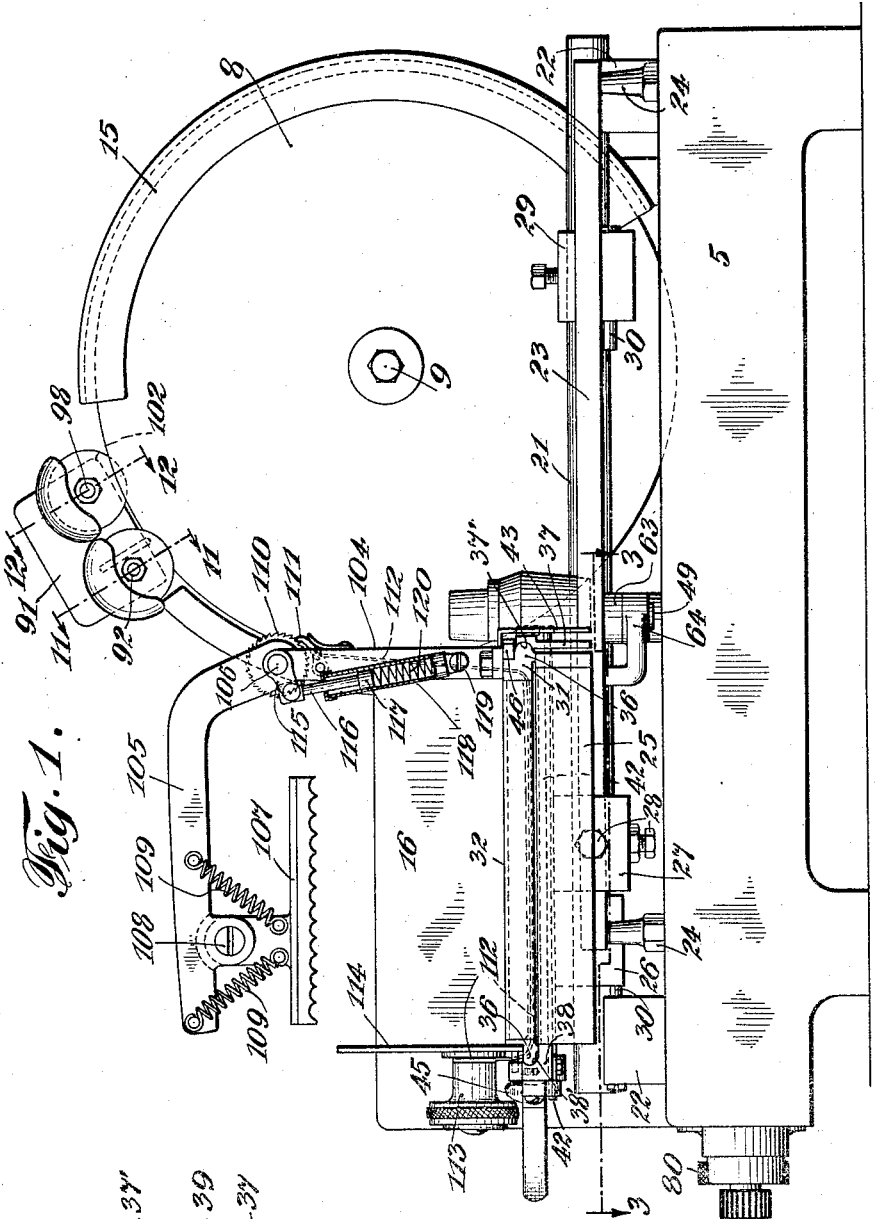
Figure 1 is a side elevation of a meat slicing machine constructed in accordance with my invention, one of the parts being shown in section.

Fig. 10 is a horizontal section taken substantially on the line 10—10 of Fig. 9, and Figs. 11 and 12 are detail sectional views taken on the lines 11—11 and 12—12 respectively of Fig. 1, illustrating the sharpening means for the knife blade.

Referring in detail to the drawings, 5 designates a suitable base structure of elongated rectangular form to one longitudinal side of which a meat slice receiving platform 6 is suitably attached. This platform extends from one end of the base to a point slightly beyond its center as seen in Fig. 2, and at the latter end of the platform there is provided a vertically disposed plate 7.

Beyond the plate 7 the meat slicing disc or blade 8 is arranged, said blade being fixed upon one end of the shaft or axis 9 journalled in a suitable bearing support 10 which may be either suitably attached to the base 6 or constitute a part of an independent motor unit indicated at 11. The motor shaft is provided with friction drive means shown at 12 engaging the face of the driving disc 13 which is fixed to the other end of the shaft 9 and is enclosed together with the drive means 12 in a suitable housing 14. To the shaft bearing 10 suitable supporting brackets for the guard 15 partially enclosing the cutting edge of the disc or blade 8 are attached.

At the side of the base 5 to which the platform 6 is attached and in advance of the slicing disc, a gauge or stop plate 16 is arranged and fixed upon the ends of spaced rods 17 which extend through suitable bearings 18 on the base 5 and are adapted for axial movement therethrough, the said plate and the rods being yieldingly held against such movement in one direction by the springs 19 which are attached to the other ends of the rods and to the opposite side of the base 5 as clearly shown in Fig. 3 of the drawings. Between the rods 17 an additional relatively short rod 20 is attached and also is slidably movable through the side wall of the base 5. The purpose of this additional rod 20 will hereinafter appear.

Upon the top of the base 5 adjacent one side thereof a longitudinally extending cylindrical rod 21 is suitably secured at its opposite ends in the pillar blocks 22 on the base and in parallel relation to the opposite longitudinal side of the base and adjacent thereto a rectangular rod 23 is rigidly secured in the plane of the rod 21 to the upper ends of the posts 24 fixed on the base 5.

The carriage 25 extending transversely of the base 5 is provided with a fixed guide block 26 slidably engaged on the rod 21 and also with a second guide block 27 which has sliding engagement on the rectangular rod 23, the latter block carrying the adjustable screws 28 to coact with angular faces of the rod 23 when it becomes necessary to compensate for wear in order to position the carriage in the proper plane.

To the rod 21 adjacent each end thereof a block 29 is fixed and in these blocks, the spring pressed cushioning pins 30 are mounted. The guide block 26 on the carriage cooperates with these spring pressed pins 30 whereby the reciprocating movement of the carriage in each direction relative to the base is cushioned or yieldably limited.

Upon the carriage 25 the bed plate or meat table 31 is supported for reciprocating movement in a direction at right angles to the direction of movement of the carriage. This bed plate or meat table is provided with a meat receiving pan indicated at 32 attached thereto by the screws 33 and provided with spaced rows of upstanding spines 34 which embed themselves in the meat placed in said pan to thereby securely hold the same against shifting upon the surface of the pan. There is also secured to the carriage 25 at the end thereof which is opposed to the gauge plate 16 a longitudinally ribbed or corrugated plate 35 which serves to hold the end of the meat which engages the face of the gauge plate substantially stationary with respect to the table during the slicing operation.

Figure 6:
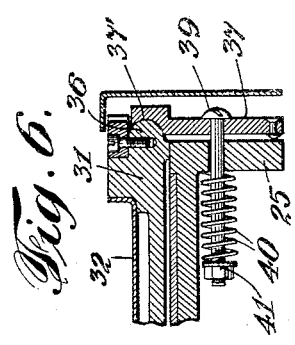
Fig. 6 is a fragmentary vertical sectional view taken on the line 6—6 of Fig. 2.
Figure 7:
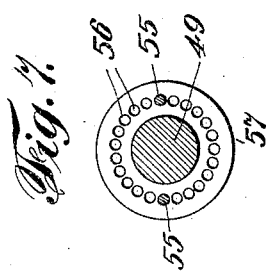
Fig. 7 is a detail horizontal section taken on the line 7—7 of Fig. 4.

The opposite side edges of the bed plate or table 31 are provided with the longitudinally extending convex ribs or beads indicated at 36. These ribs are slidably engaged in concave grooves or channels 37' and 38' provided in the inner sides of the guide plates 37 and 38 respectively, and adjacent their upper edges. These guide plates are mounted upon opposite sides of the carriage 25, the plate 38 being rigidly fixed in position relative to the carriage while the plate 37 is adjustable with respect thereto. The latter plate is provided with spaced rods as shown at 39 extending loosely through openings provided in the side wall of the carriage 25 and as shown in Fig. 6 of the drawings, a coil spring 40 surrounds the inner end of each of these rods and bears at one of its ends against the wall of the carriage 25 and its other end against an adustable nut 41 whereby the tension of said spring may be adjusted or regulated. A rotatable rod indicated at 42 also extends transversely across the carriage 25 and is provided at one of its ends with a cam disc 43, the purpose of which will be later explained.

At one of its longitudinal edges and above the rib 36 a longitudinally extending rack 46 is secured to the table 31. A gear or pinion 47 is in constant mesh with this rack. This pinion is secured to or formed upon one end of a sleeve or collar 48 which is loosely mounted upon the upper end of a vertical shaft 49 mounted in a suitable bearing bracket 50 fixed to the plate 37. This collar immediately below the gear 47 is provided with a circumferential groove 48' receiving the pivoted member 53 provided upon the end of a lever 51 which is pivoted as at 52 upon the plate 37. The lever 51 carries a bearing piece 44 for engagement by the cam 43 upon rotation of shaft 42 by manipulation of the finger piece 45 fixed to said shaft. The lever 51 may thus be conveniently operated to lift the sleeve 48 against the action of a coil spring 54 on the upper end of the shaft 49 which exerts a downward pressure on the gear 47 to retain spaced pins or studs 55 projecting downwardly from the lower end of the sleeve in two of the openings of a circular series of openings 56 which are provided in an annular flange 57 formed upon the shaft 49. Thus, it will be understood that in this maner the sleeve 48 and gear 47 are normally locked to the shaft 49 for rotation therewith.

Below the bearing 50 a ratchet disc 58 is fixed to the shaft 49 and is enclosed within a casing 59 having removable top or cover 60. This ratchet casing is provided with a lateral extension in which a pivoted spring pressed pawl 61 is housed and is yieldingly held at its free end in engagement with the teeth of the ratchet 58. The casing 59 is fixed as at 62 upon the end of a lever 63 which is loose on the shaft 49, said lever and the casing 59 being retained in assembled relation with the ratchet 58 by the bracket 64 receiving the lower end of said shaft.

The other end of lever 63 carries an antifriction roller 65 for engagement with a nose or lateral projection 67 formed on the free end of a lever 66 which is fixed to the upper end of a vertical shaft 68 mounted to rotate in suitable bearings provided upon the base 5. A coil spring 69 has one of its ends attached to a stud 70 projecting from the wall of the casing 59 and its other end is suitably attached to a fixed part such as the bearing bracket 64. There is also fixed to the casing 59, a radially projecting stud 71 adapted to contact with said fixed part at 72 to limit rotation of said casing and the lever 63 in one direction relative to the ratchet 58.

In the base 5 a longitudinally extending shaft 73 is rotatably supported and is provided with a coarse spiral groove 74 with which the internal thread of the sleeve 75 is engaged. This sleeve at one end is provided with a bifurcated lug 77 extending between the vertically spaced forks of an arm 78 fixed on the shaft 68, said lug 77 cooperating with the pin 79 connecting said forks of the arm 78. One end of shaft 73 projecting beyond the end of the base 5 is provided with a knob 80 having suitably spaced graduations 81 marked thereon adapted to be positioned relatively to a suitable index mark on the wall of the base. It will be readily understood from this description that upon rotation of the shaft 73, sleeve 75 is caused to travel longitudinally thereof and by the cooperation of the lug 77 on said sleeve with the pin 79 in arm 78, the shaft 68 is rotated whereby the free end of lever 66 will be positioned relative to the path of movement of the roller 65 on arm 63 in the return movement of the carriage 25 to position for cutting a meat slice. Simultaneously with this adjustment of lever 66 which determines the extent of movement of lever 63 and therefore, of the movement of the meat plate or bed 31, the gauge plate 16 is correspondingly adjusted. This adjustment is effected through the medium of the eccentric 82 fixed on shaft 73 which has constant bearing engagement against the inner end of the rod 20. From reference to Figs. 2 and 3 of the drawings, it will thus be seen that when the rod 73 is rotated in one direction, the eccentric will force the rod 20 outwardly against the action of the springs 19 connected with rods 17, thus moving the gauge plate away from the cutting edge of the blade or disc 8 to increase the thickness of the meat slice. The simultaneous adjustment of the lever 66 correspondingly effects an increase in the extent of movement of the meat plate or bed 31 so as to secure contact of the end of the meat against the face of the gauge plate. If the shaft 73 is rotated in the opposite direction, pressure of eccentric 82 against rod 20 is released and the springs 19 then contract to move the plate 16 inwardly towards the plane of rotation of the cutting edge of the disc 8, and lever 66 is adjusted to correspondingly decrease the extent of movement of the meat plate or bed 31, thereby decreasing the thickness of the meat slice.

From the above description, it will be evident that in the return movement of the carriage after cutting each slice the roller 65 on the end of lever 63 will strike the relatively stationary lever 66 and as the casing 59 is fixed to the lever 63, the pawl 61 therein coacting with the teeth of the ratchet 58 will result in rotation of the shaft 49 and the pinion 47 engaging rack 46 will cause the movement of the table or bed plate 31 to an extent determined by the position of the lever 66 whereby the end of the meat on the end of the table or bed plate is again brought into contact with the face of the gauge plate 16.

After the meat on the bed plate has been substantially entirely cut up in slices and it is necessary to retract the bed plate away from the gauge plate 16, shaft 42 is rotated so that cam 43 will actuate lever 51, and thus release the clutch connection between gear or pinion 47 and the shaft 49. The table or bed plate 31 may then be moved upon the carriage away from the gauge plate 16 while the shaft 49 and lever 66 remain relatively stationary. Upon reversing the rotation of the shaft 42 and disengaging the cam from the bearing piece 44 on lever 51, the spring 54 returns the gear 47 to its normal position in mesh with the rack 46 and again connects the gear with the shaft 49 for unitary rotation by engagement of the studs 55 in the openings 56 of the shaft flange 57.

In order to prevent the meat slices from falling between the cutting edge of the disc or blade 8 and the inner face of the gauge plate 16, I provide a deflecting device for the meat slices which consists of the plate 83 pivotally mounted on vertically spaced brackets 84 provided on the plate 7 at the end of the platform 6. This plate has a curvilinear edge 85 adapted to be adjustably positioned within a groove 86 formed in the outer face of the slicing disc 8 in spaced concentric relation to the cutting edge thereof. This adjustment of the plate 83 is effected by means of the screw 87 engaged in a threaded bore on the lug 88 formed on the upper end of the plate and rotatably mounted in the bearing 89 swiveled as at 90 upon the plate 7. By adjusting the screw 87, it will be readily seen that the edge 85 of the plate 83 may be positioned with respect to the wall of the groove 86. This plate has a convex curved surface so that the meat slices as they leave the cutting edge of the disc 8, are deflected laterally from the outer face of the disc and upon the platform 6.

I have also provided as a permanently assembled unit in the machine, a convenient means whereby the cutting edge of the disc 8 may be easily maintained in a sharpened or keen condition. Thus, as shown in detail in Figs. 11 and 12, I provide a suitable supporting means 91 adjacent the outer side of the disc 8. In this supporting means a shaft 92 is mounted to rotate within a suitable sleeve 93, said sleeve and shaft being axially movable as a unit in the support against the resistance of a spring 94. To one end of the shaft, an abrasive disc 95 is fixed, the other end of the shaft having a suitable finger piece 96. The disc 95 is positioned in a plane inwardly of the plane of the cutting edge of the disc 8 and normally out of contact therewith as clearly shown in Fig. 11 of the drawings. When it is desired to sharpen the inner side of the cutting edge of the disc, the finger piece 96 is grasped and the shaft 92 and rod 93 are pulled outwardly. Preferably, the sleeve 93 is keyed in the support 91 as indicated at 97 and thereby held against rotation. While the abrasive disc 95 is thus held against the inner side of the edge of the disc 8, it may be readily rotated by turning the shaft 92 so as to obtain uniform wear of the abrasive material.

There is also mounted in the support 91, a second rod or shaft 98 within the sleeve 99 which is keyed in the support as at 100. The shaft and sleeve are yieldingly sustained against an inward movement towards the cutting disc 8 by the coil spring 101. The abrasive disc 102 on the end of the shaft 98 is normally disposed in a plane outwardly spaced from the cutting edge of the disc 8. A finger piece 103 is fixed on the outer end of the shaft 98, and by pressing inwardly thereon, the abrasive disc 102 may be engaged with the cutting edge of disc 8 at the outer face thereof, said disc being also rotated to secure uniform wear of the abrasive material.

For the purpose of securely clamping the meat upon the pan 32, I provide a standard 104 rigidly fixed at its lower end upon the bed plate 31 at one of its edges and to the upper end thereof the angularly disposed end portion of an arm 105 is pivoted as at 106. This arm extends transversely across the meat table and to the free end thereof a meat gripping plate 107 is pivotally attached and suspended from said arm as at 108. Coil springs 109 yieldingly maintain said plate 107 in a normal position against pivotal swinging movement. To the pivot or axis 106 of the arm 105 a ratchet 110 is fixed and is engaged by a spring pressed pawl 111 pivotally mounted on the standard 104. A wire indicated at 112 is connected to this pawl and is extended through suitable guide means under the bed plate 31 and is attached at the opposite side of the bed plate to a rotatable knob 113 which is mounted upon the outer side of the vertically disposed plate 114 extending along the side edge of the bed plate 31.

To the axis 106 of arm 105 at one of its ends, the crank arm 115 is secured and is connected with the uper end of a piston rod 116 having a piston head 117 at its other end operating in the cylinder 118 which is pivoted at its lower end as at 119 upon the standard 104. A coil spring 120 within said cylinder operates against the head 117 to yieldingly urge the piston rod 116 upwardly. From this construction, it will be readily seen that when the arm 105 is swung downwardly to engage the toothed surface of the plate 107 upon the upward side of the meat arranged on the pan 32, the spring 120 is placed under compression within the cylinder 118, said plate 107 being retained in its applied position by the locking pawl 111 engaging the teeth of ratchet 110. When it is desired to remove the meat from the pan 32, the clamping pressure of plate 107 upon the meat may be readily released by merely turning the knob 113. The end of the wire 112 will thus be wound on said knob and the pull of the wire disengages the pawl 111 from the ratchet 110, thus permitting the spring 120 to expand, forcing the piston rod 116 upwardly, which in turn through its connection with the axis 106 lifts the arm 105, thus elevating the plate 107 out of contact with the meat.

From the foregoing description considered in connection with the accompanying drawings, the construction, manner of operation and several advantages of my invention will be clearly and fully understood. It will be seen that I have devised a very simple and novel meat slicing machine wherein the several co-operating elements are compactly arranged, and in which the several adjustments may be easily and quickly made so that meat slices of various thicknesses can be accurately and rapidly cut. I have herein disclosed one simple and practical embodiment of the various novel features of my present improvements, but it will nevertheless be understood that the same may be susceptible to more or less modification in the form, proportion and relative arrangement of the various elements, and I therefore, reserve the privilege of resorting to all such legitimate changes therein as may be fairly incorporated within the spirit and scope of the invention as claimed.

I claim:

1. In combination with a slicing machine having a vertically positioned rotary cutting knife, a bed plate for the material to be sliced mounted for horizontal reciprocating movement at one side of the knife, a relatively stationary adjustable gauge plate in advance of the cutting knife, means for moving said bed plate at right angles to its path of reciprocation at the end of its return movement after cutting each slice to engage the material with one side of the gauge plate, said means including an adjustable member governing the extent of the last mentioned movement of the bed plate, and a single manually operable means for simultaneously making such adjustment of position of said member and varying the position of the gauge plate relative to the plane of rotation of the cutting knife to regulate the thickness of the cut slices.

2. In combination with a slicing machine having a vertically positioned rotary cutting knife, a bed plate for the material to be sliced mounted for horizontal reciprocating movement at one side of the knife, a relatively stationary adjustable gauge plate in advance of the cutting knife, means for moving said bed plate at right angles to its path of reciprocation at the end of its return movement after cutting each slice to engage the material with one side of the gauge plate, said means including an adjustable member governing the extent of the last mentioned movement of the bed plate, spaced elements for adjusting said member and the gauge plate respectively, and a single manually operable member for simultaneously actuating said elements to thereby properly co-relate the position of the gauge plate and the feeding movement of the bed plate with respect to the plane of rotation of the cutting knife to obtain the desired thickness of the cut slice.

3. In combination with a slicing machine having a vertically positioned rotary cutting knife, a bed plate for the material to be sliced mounted for horizontal reciprocating movement at one side of the knife, a relatively stationary adjustable gauge plate in advance of the cutting knife, means for moving said bed plate at right angles to its path of reciprocation at the end of its return movement after cutting each slice to engage the material with one side of the gauge plate, said means including an adjustable member governing the extent of the last mentioned movement of the bed plate, a manually rotatable shaft, and spaced element on said shaft operatively engaged with parts coacting with said adjustable member and the gauge plate respectively simultaneously actuated upon rotation of said shaft to adjust said member and position the gauge plate relative to the plane of rotation of the cutting knife to thereby regulate the thickness of the cut slices.

4. In combination with a slicing machine having a vertically positioned rotary cutting knife, a bed plate for the material to be sliced mounted for horizontal reciprocating movement at one side of the knife, a relatively stationary adjustable gauge plate in advance of the cutting knife, means for moving said bed plate at right angles to its path of reciprocation at the end of its return movement after cutting each slice to engage the material with one side of the gauge plate, said means including an adjustable member governing the extent of the last mentioned movement of the bed plate, a manually rotatable shaft, a part fixed to the gauge plate, an eccentric on the shaft engaged with said part, an element having a threaded connection with said shaft for movement axially thereof, and means operatively connecting said element with said adjustable member, said element and the eccentric being simultaneously operable upon rotation of said shaft to adjust said member and position the gauge plate relative to the plane of movement of the cutting knife to thereby regulate the thickness of the cut slices.

5. In combination with a slicing machine having a vertically positioned rotary cutting knife, a bed plate for the material to be sliced mounted for horizontal reciprocating movement at one side of the knife, a relatively stationary adjustable gauge plate in advance of the cutting knife, a manually rotatable shaft, an eccentric on said shaft, a rod fixed to the gauge plate, means yieldingly urging the gauge plate in one direction to hold the end of said rod in bearing contact with the eccentric, said eccentric upon rotation of the shaft moving said gauge plate to position the same relative to the plane of rotation of the cutting knife, means for moving said bed plate at right angles to its path of reciprocation at the end of its return movement after cutting each slice to engage the material with one side of the gauge plate, said means including relatively adjustable parts for regulating the extent of such feeding movement of the bed plate in accordance with the position of the gauge plate relative to the cutting knife, and actuating means for one of said parts connected with said manually rotatable shaft and operated thereby to adjustably position said part simultaneously with the adjustment of the gauge plate.

6. In a slicing machine having a vertically positioned rotary cutting knife, a gauge plate in advance of said knife and means for adjustably positioning said plate in the plane of rotation of the knife, a bed plate for the material to be sliced mounted for horizontal reciprocating movement at one side of the gauge plate and the knife, and means for moving said bed plate at right angles to its path of reciprocation at the end of its return movement after cutting each slice to feed the material against one side of the gauge plate, said means including a rack on the bed plate, a vertical shaft, a pinion loose on the shaft engaged with said rack, a manually releasable clutch device operatively connecting said pinion with the shaft, a lever loosely engaged at one of its ends on said shaft, ratchet means for rotating said shaft upon movement of the lever in one direction, and a relatively stationary member positioned in the path of movement of the free end of said lever to move the latter to actuate said shaft and the pinion and move said bed plate.

In testimony that I claim the foregoing as my invention, I have signed my name thereto.

CHARLES HELD.